United States Patent [19]

Hansen

[11] 4,276,593

[45] Jun. 30, 1981

[54] TRANSFER SYSTEM FOR MULTI-VARIABLE CONTROL UNITS

[75] Inventor: Paul L. Hansen, Brea, Calif.

[73] Assignee: Beckman Instruments, Inc., Fullerton, Calif.

[21] Appl. No.: 25,515

[22] Filed: Mar. 30, 1979

[51] Int. Cl.³ .................. G06F 15/46; G06F 15/16; G06F 11/16
[52] U.S. Cl. .................................. 364/119; 364/101; 371/9
[58] Field of Search ............ 364/119, 107, 100, 101, 364/102, 200 MS File, 900 MS File; 235/307, 304, 303.3, 302.3, 302, 303; 371/9, 21, 66, 71; 340/347 M

[56] References Cited

U.S. PATENT DOCUMENTS

| | | | |
|---|---|---|---|
| 3,444,528 | 5/1969 | Lovell et al. | 235/303.3 X |
| 3,471,686 | 10/1969 | Connell | 235/307 |
| 3,636,331 | 1/1972 | Amrehn | 364/119 X |
| 3,786,433 | 1/1974 | Notley et al. | 235/303.3 X |
| 3,898,441 | 8/1975 | Davis et al. | 235/304 X |
| 3,991,407 | 11/1976 | Jordon, Jr. et al. | 364/200 |
| 4,096,990 | 6/1978 | Strelow | 235/307 |
| 4,153,198 | 5/1979 | Eki et al. | 235/303.3 |

Primary Examiner—Joseph F. Ruggiero
Attorney, Agent, or Firm—Robert J. Steinmeyer; P. R. Harder; Edward C. Jason

[57] ABSTRACT

An automatic transfer method and apparatus for a multi-variable control unit having at least two process control units is disclosed which initiates transfer from the selected controller to the non-selected controller through failure of the selected controller to produce transfer preventing signals.

11 Claims, 1 Drawing Figure

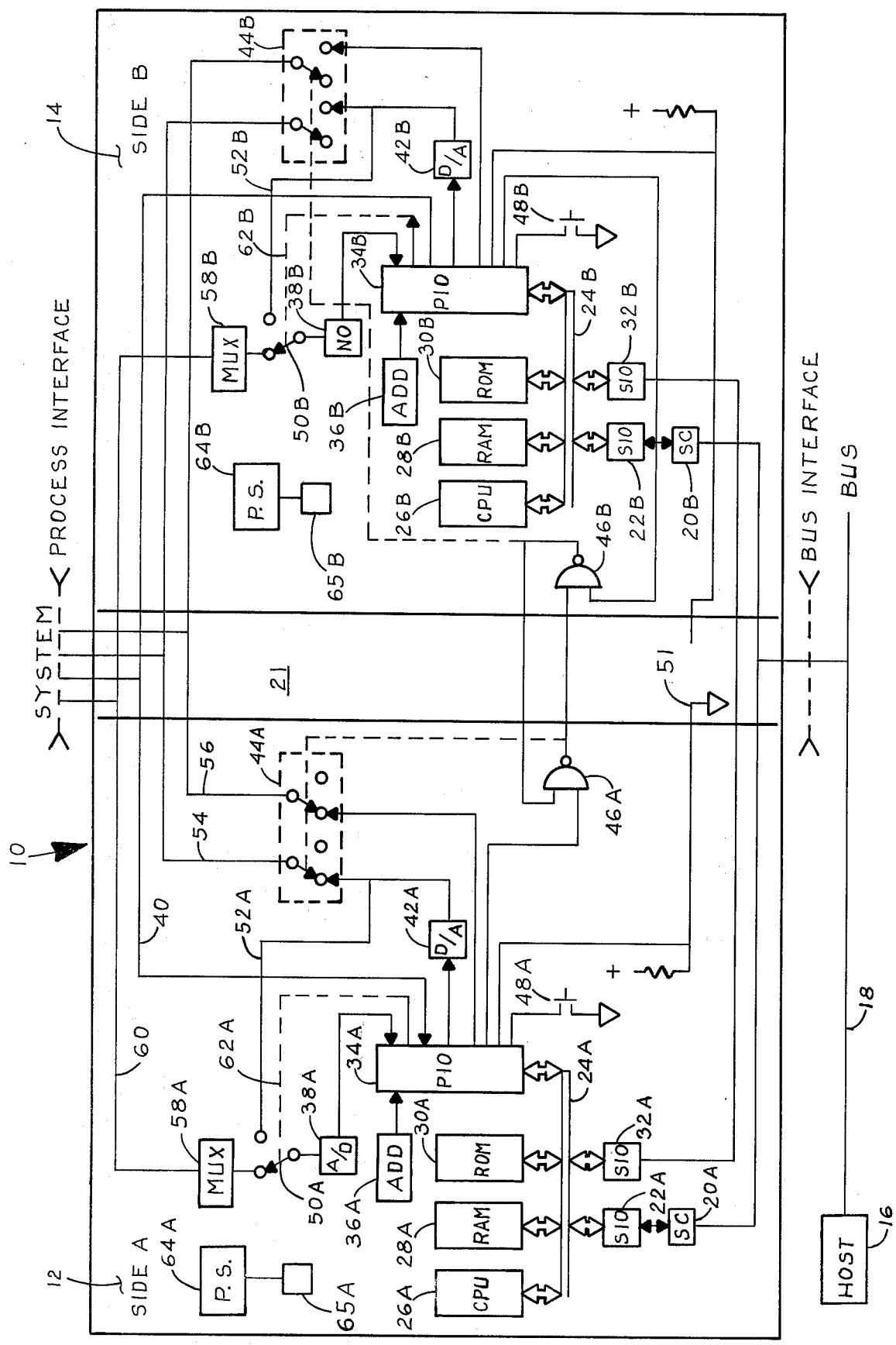

TRANSFER SYSTEM FOR MULTI-VARIABLE CONTROL UNITS

BACKGROUND OF THE INVENTION

The present invention relates to apparatus and methods for transferring control from one control unit of a multi-variable control unit to another and more particularly to apparatus and methods for transferring control which include intercommunication between control units of a multi-variable control unit, that is, a unit processing many variables.

Prior art has disclosed several systems for transferring control from one control unit to another control unit. Most of these transfer systems are manual, that is, when one control unit ceased to function, a technician would manually transfer control from one unit to a back-up unit. Prior art has also disclosed a sophisticated automatic transfer system wherein the back-up controller monitors the primary controller and automatically initiates transfer whenever the primary controller performs a function with which the back-up controller does not agree.

The deficiency of manual control systems is that it is unreliable, requiring both the presence and alertness of a technician to manually transfer control from one controller to another. Although the technician may be extremely reliable, a complex system requires close evaluation of several variables which will divide his or her attention. Sophisticated automatic transfer systems have their deficiency in the complexity of circuitry involved and in the fact that when transfer is initiated due to a disagreement between controllers, the differences between the back-up controller calculations and the primary controller calculations could be due to circuit imbalances as well as a faulty primary controller. In addition, the back-up controller may be incorrectly calculating values due to its own component failure. The two systems, although identical in component content, may nevertheless be imbalanced due to manufacturing inequalities of the components. While any imbalance may not be apparent in macroscopic calculations, it may show up in microscopic calculations. This detracts from the overall system accuracy since percentage errors must be permitted to prevent "false" or unnecessary transfers.

It is therefore an object of the present invention to provide a reliable automatic transfer system and apparatus.

It is also an object of the present invention to provide an automatic transfer system which requires no complex circuitry.

It is a further object of the present invention to provide an inexpensive automatic transfer system.

SUMMARY OF THE INVENTION

The present invention overcomes the deficiencies of prior art manual systems by performing an automatic transfer when a primary controller, the controller operating the system, malfunctions. It overcomes the deficiency of prior art automatic transfer systems by initiating transfer through controller self-diagnostics. The controller in control performs self-diagnostic functions and permits control transfer when it is no longer capable of performing its function. The present invention comprises two control units, a selected controller controlling the specific functions for which it is designed and a non-selected controller tracking, or making identical calculations but feeding its control outputs to an open circuit. The selected controller periodically indicates to the non-selected controller that it is operating in conformity with design standards. When the selected controller is no longer capable of performing the desired functions, it will cease sending an indication that "all is well" to the non-selected controller and the non-selected controller will take control from the selected controller. By providing a self-test feature, the present invention eliminates the deficiencies of prior art automatic transfer systems wherein the alternate controller will take control of the system whenever its outputs disagree with the outputs of the primary controller. Since this may be due to imbalance in the systems due to manufacturing inequalities between identical components, false transfers are prevented. Furthermore, when an automatic transfer has taken place, the selected controller is incapable of taking control from the non-selected controller. Thus, an automatic transfer system is provided which totally eliminates the problem of false transfers in automatic transfer systems and the unreliability of manual transfer systems.

BRIEF DESCRIPTION OF THE DRAWING

The accompanying FIGURE illustrates in block form, a dual control system embodying the present invention.

DESCRIPTION OF THE PREFERRED EMBODIMENT

The FIGURE illustrates a dual control system 10, having identical control units 12 and 14. Identical components of units 12 and 14 are similarly numbered, the components of unit 12 having a suffix A and the components of unit 14 having the suffix B. In the preferred embodiment multi-variable control unit 10 is illustrated as receiving the control information from host computer 16 through bus 18 which connects to control units 12 and 14 through slave coupler 20A and 20B, respectively. All interconnections between control units 12 and 14 are permanently fixed in interconnect area 21. Further description will be with respect to control unit 12, however, it is to be understood that control unit 14 is an identical unit having identical components distinguished only by the suffix in their numerical designation.

Slave coupler 20A is connected to serial input output 22A which is connected to information bus 24A. Information bus 24A receives inputs from and issues outputs to central processing unit 26A, random access memory 28A, read only memory 30A, serial input output 32A and parallel input output 34A. Serial input output 32A is connected to an identical serial input output 32B in controller 14. Parallel input output 34 receives additional inputs from address 36A, analog-to-digital converter 38A and digital inputs from bus 40. Parallel input output 34A supplies inputs to digital-to-analog converter 42A, interface switch 44A, NAND gate 46A, ground switch 48A, a control input to two-way switch 50A and receives indication that it is the selected controller by ground connection 51 located in interconnect area 21. Digital-to-analog converter 42A supplies the second input to interface switch 44A and the alternate input to a switch 50A through conductor 52A. NAND gate 46A receives an additional input from the output side of NAND gate 46B and supplies its output to the input side of NAND gate 46B. The output of NAND gate 46A controls the position of interface switch 44A and the output of NAND gate 46B controls the position of interface switch 44B. Interface switch 44A receives analog inputs from digital-to-analog converter 42A and digital inputs directly from parallel input output 34A and supplies digital and analog outputs to busses 56 and 54, respectively.

Two-way switch 50A may have as its input either the output of multiplexer 58A or the output of digital-to-analog converter 42A. Multiplexer 58A receives analog inputs from bus 60. Parallel input output 34 controls the position of two-way switch 50A as indicated at 62A. Power supply 64A supplies all power for the individual control units, that is, power supply 64A supplies the power for control unit 12 while power supply 64B supplies the power for control unit 14. Power supply 64A is connected to relay 65A which may be an undervoltage relay or a loss of power relay known in the art.

In operation, host computer 16 feeds program information to both control units simultaneously through bus 18. Indication as to which controller is to be selected is determined by ground connection 51. Address 36 identifies whether its controller has been selected and proceeds accordingly. For the purposes of this example controller 12 is the selected controller and controller 14 is the non-selected controller. Both control units 12 and 14 will receive analog and digital process information through busses 60 and 40, respectively. The controller which has been selected to control the system process will perform programmed calculations and issue analog and digital outputs to the system through busses 54 and 56, respectively while the non-selected controller will perform the calculation and issue outputs to open circuits. Analog inputs from bus 60 will be received by multiplexer 58A and be transferred to analog-to-digital converter 38A which will supply a digital input to parallel input output 34B. Parallel input output 34A will feed the information to the microprocessor comprising central processing unit 26A, random access memory 28A and read only memory 30A. The information received by parallel input output 34A will be processed by central processing unit 26A according to the program contained in read only memory 30A and produce calculated values to be transmitted by parallel input output 34A to busses 54 and 56 through interface switch 44A. Interface switch 44A connects the outputs of parallel input output 34A and digital-to-analog converter 42A to busses 56 and 54, respectively, when controller 12 has system control. When controller 12 does not have system control, the outputs of parallel input output 34A and digital-to-analog converter 42A are fed to an open circuit. Interface switches 44A and 44B are interlocked so that only controller 12 or controller 14 is permitted to have system control at any given time. That is, when interface switch 44A is closed, interface switch 44B must be open and when interface switch 44A is open, interface switch 44B must be closed. While the selected controller, for example control unit 12, is functioning properly, a message signal "all is well" is sent by central processing unit 26A to the non-selected controller, control unit 14, through serial input outputs 32A and 32B. Similarly, non-selected controller, central processing unit 26B in control unit 14 sends a message signal "I am ready" to selected controller, control unit 12. The "all is well" and "I am ready" messages may be in any digital format such as a burst of four digital pulses to indicate "all is well" and a burst of three digital pulses to indicate "I am ready." However, the exact format of the message may be of any type known to one skilled in the art. When the selected controller is not functioning properly, the "all is well" message will not be sent by central processing unit 26A. Typical conditions under which the selected controller is not considered to be functioning properly; first, faulty analog-to-digital or digital-to-analog conversion, second, loss of power, third, incorrect information in the read only memory and fourth, failure of the memory. However, as can be determined by one skilled in the art, there are many other conditions under which the selected controller will not be considered as functioning properly and an automatic transfer may be desired.

The first basis for automatic transfer is error between analog and digital conversion. Information which must be converted to analog signals for bus 54 will be converted in digital-to-analog converter 42A. Periodically, preferably every few seconds, parallel input output 34A transfers inputs to switch 50A from multiplexer 58A to digital-to-analog converter 42A. A predetermined digital signal from access memory 28A will be fed to digital-to-analog converter 42A through parallel input output 34A. Digital-to-analog converter 42A will convert the predetermined digital signal to an analog signal. The analog signal is then fed through switch 50A to analog-to-digital converter 38A to be converted back to a digital signal. This digital signal from analog-to-digital converter 38A will be compared with the predetermined digital signal sent by parallel input output 34A to digital-to-analog converter 42A. The predetermined signal may be one or may be a series of signals testing all possible combinations of digital information within the range of analog information sent to the system (not shown). If these digital signals do not coincide, the "all is well" signal indicating that everything is functioning properly sent by controller 12 from central processing unit 26A to controller 14 through serial input output 32A will cease and controller 14 will take control of the system operation.

The second condition under which the selected controller will shut down and cease sending the signal to the non-selected controller is when power supply 64A fails as indicated by a percentage drop in voltage. This may be accomplished preferably by an undervoltage relay 65A. However, other undervoltage detection or loss of power systems are equally suitable and known by those skilled in the art. When the voltage supplied by power supply 64A drops 5% or more, undervoltage relay 65A will indicate loss of power to central processing unit 26A which will cease sending an "all is well" signal to the non-selected controller through serial input outputs 32A and 32B. Absence of the "all is well" signal will indicate to controller 14 that it should take system control from controller 12.

The third condition under which the selected controller will cease sending the signal to the non-selected controller is when read only memory 30A fails its self test. Read only memory 30A is tested by supplying information from random access memory 28A which central processing unit 26A processes according to the program in read only memory 30A and produces a response. The information is processed through a programmed algorithm and the response should always be the same. If the response calculated through the programmed algorithm deviates from the response required which is supplied by random access memory 28A, central processing unit 26A will cease sending the "all is well" signal to non-selected controller 14 and controller 14 will take control of the system. This test may also be performed by doing a comparison between read only memories 30A and 30B or by host computer 16 requesting or reading the information in read only memory 30A. The essence of this test is that the information in read only memory 30A is incorrect and system control should be transferred to non-selected controller 14.

The fourth circumstance under which control will be transferred from the selected controller to non-selected controller is a circumstance where the selected controller is requiring too much time to perform the system functions, indicating memory failure. Selected controller 12, by central processing unit 26A, periodically sends an "all is well" signal to the non-selected controller through serial input output 32A to 32B when it finishes the predetermined program in read only memory 30A. This signal is sent every time the system inputs have been calculated and sent. If the selected controller requires excess amounts of time to calculate the parameters, an "all is well" signal is not forwarded to non-selected controller 14. When this happens, non-selected controller 14 begins a timing function and after a brief period of time, several milliseconds preferred, the non-selected controller will take control from the selected controller.

The transfer from the selected controller to the non-selected controller takes place through the use of two NAND gates 46A and 46B which comprise an RS flip-flop. For the purposes of this discussion high signals are referred to as true signals and low signals are referred to as false signals. During normal operation central processing unit 26A through parallel input output 34A feeds a status signal in the form of a true signal to NAND gate 46A and central processing unit 26B through parallel input output 34B feeds a status signal in the form of a true signal to NAND gate 46B. The second input to NAND gate 46A will be false. Thus, the output of NAND gate 46A will be a true. Since the output of NAND gate 46A comprises the second input to NAND gate 46B, the output of NAND gate 46B will be a false.

Whenever the non-selected controller, in this example, control unit 14, ceases to receive an "all is well" signal from selected controller, control unit 12, central processing unit 26B changes its status input to NAND gate 46B to a false. The combination of a true input and a false input to NAND gate 46B changes the output from a false to a true. This true signal is fed back to the second input to NAND gate 46A. The two true inputs to NAND gate 46A change its output to a false. The two false inputs to NAND 46B will still maintain its output as a true. The true output from NAND gate 46B will transfer interface switch 44B from its open circuit position to a closed circuit so that non-selected controller, control unit 14, now provides the output to busses 54 and 56. The false signal from the output of NAND gate 46A will permit interface switch 44A to transfer from a complete circuit to an open circuit for the outputs of parallel input output 34.

As indicated by the foregoing, the present invention eliminates the problems inherent in a manual transfer by providing an automatic transfer system. The present invention eliminates the "false" transfer problems of prior art automatic transfer systems by providing a self-diagnostic function to initiate automatic transfer.

The foregoing embodiment of the present invention is given by way of example only and is not limited thereto but is limited by the scope of the following claims.

Having thus described my invention, I claim:

1. Control transfer apparatus in a system having two controllers, a selected controller and a non-selected controller, said transfer apparatus comprising:

means contained within each of said controllers for determining proper functioning of such controller;

means interconnecting said controllers for transmitting a signal from each controller to the other indicating that such controller is functioning properly;

status signal sending means contained within each of said controllers for generating a signal indicating that the other controller is functioning properly;

transfer means for transferring operation from said selected controller to said non-selected controller whenever said selected controller is not functioning properly, said transfer means including first means for receiving a first and second input and producing an output, both inputs having a high and a low state, second means for receiving a third and fourth input and producing an output, both inputs having a high and a low state, said first input connected to said output of said second means, said second input connected to said status signal sending means of said selected controller and said output of said first means having a low state whenever said first and second inputs are in a high state and a high state whenever said first and second inputs are not both in a high state, said third input connected to said output of said first means, said fourth input connected to said status signal sending means of said non-selected controller and said output of said second means having a low state whenever said third and fourth inputs are in a high state and a high state whenever said third and fourth inputs are not both in a high state.

2. The apparatus of claim 1 wherein said determining means includes a loss of power relay.

3. The apparatus according to claim 1 wherein said controllers include analog-to-digital and digital-to-analog converter means and said determining means includes means for determining whether analog-to-digital and digital-to-analog conversions are correct.

4. The apparatus according to claim 1 wherein said controllers include means for performing predetermined control calculations and said determining means includes comparing means for determining whether performed control calculations are said predetermined control calculations.

5. The apparatus according to claim 1 wherein said first means and said second means comprise NAND gates.

6. Control transfer apparatus in a system having two controllers, a selected controller having system control and a non-selected controller, each of said controllers having a memory, a power supply, an analog-to-digital converter and a digital-to-analog converter, said apparatus comprising:

analog means for testing the operation of said analog-to-digital converter and said digital-to-analog converter and producing a first signal in response to a test failure;

memory means for determining whether performed control calculations match predetermined control calculations and producing a second signal in response to a test failure;

power means for determining loss of power in said power supply and producing a third signal in response thereto;

signal means responsive to said first, second and third signals for providing a fourth signal from each of said controllers to the other controller indicating that each respective controller is functioning properly when said first, second and third signals are absent;

status signal sending means contained within each of said controllers for generating a signal indicating that the other controller is functioning properly;

transfer means connected to said status signal sending means for transferring control from said selected controller to said non-selected controller upon occurrence of a failure in said selected controller and in the absence of a failure in the nonselected controller, said transfer means including first means for receiving a first and second input and producing an output, both inputs having a high and low state, second means for receiving a third and fourth input and producing an output, both inputs having a high and a low state, said first input connected to the output of said second means, said second input connected to said status signal sending means of said selected controller and said output of said first means having a low state whenever said first and second inputs are in a high state and having a high state whenever said first and second inputs are not both in a high state, said third input connected to said output of said first means, said fourth input connected to said status signal sending means of said non-selected controller and said output of said second means having a low state whenever said third and fourth inputs are in a high state and having a high state whenever said third and fourth inputs are not both in a high state.

7. The apparatus according to claim 6 wherein said first means and said second means include NAND gates.

8. The apparatus according to claim 6 wherein said power means includes a loss of power relay.

9. The apparatus according to claim 6 wherein said analog means comprises a microprocessor containing a predetermined digital signal.

10. The apparatus according to claim 6 wherein said memory means comprises a microprocessor.

11. A redundant multi-variable control apparatus comprising:
- a first, normally selected controller and a second, normally non-selected controller, each including means for receiving data indicative of the condition of a process to be controlled, means for performing calculations based upon such data and issuing output signals to control process variables;
- output interconnect means having a first state in which said first controller controls said process variables and a second state in which said second controller controls said process variables;
- self-diagnostic means contained within each of said controllers for diagnosing the proper operation of such controller and providing an output to the other controller indicating that such controller is operating properly;
- means in each of said controllers generating a status signal indicating that the other controller is operating properly;
- transfer means including:
  (a) a first input connected to said first controller to receive a status signal indicative of the proper operation of said second controller,
  (b) a second input connected to said second controller to receive a status signal indicative of the proper operation of said first controller,
  (c) at least one output connected to said output interconnect means, said transfer means serving as means for maintaining the first state of said output interconnect means when the status signals from said first and second controllers indicate that said second and first controllers, respectively, are operating properly, and for establishing the second state of said output interconnect means when the status signal from said second controller indicates that said first controller is not operating properly.

* * * * *